United States Patent [19]

Segoshi et al.

[11] Patent Number: 5,124,895
[45] Date of Patent: Jun. 23, 1992

[54] ELECTRIC DISCHARGE LAMP ARRANGEMENT AND HEADLAMP FOR MOTOR VEHICLE USING SAME

[75] Inventors: Toru Segoshi, Yokohama; Tohru Futami, Fujisawa; Yoichi Iijima, Zama; Masao Sakata, Yokohama, all of Japan

[73] Assignee: Nissan Motor Co., Ltd., Yokohama, Japan

[21] Appl. No.: 596,303

[22] Filed: Oct. 15, 1990

[30] Foreign Application Priority Data

Oct. 23, 1989 [JP] Japan .................................. 1-275654

[51] Int. Cl.$^5$ .................................................. F21K 7/00
[52] U.S. Cl. ...................................... 362/265; 362/61; 362/263; 315/85
[58] Field of Search ................. 362/61, 80, 263, 265, 362/201; 315/85

[56] References Cited

U.S. PATENT DOCUMENTS

| | | | |
|---|---|---|---|
| 4,316,240 | 2/1982 | Pitkjaan et al. | 362/61 |
| 4,477,863 | 10/1984 | Walz | 362/265 |
| 4,714,986 | 12/1987 | Wurster | 362/263 |
| 4,772,989 | 9/1988 | Haraden | 362/263 |
| 4,920,459 | 4/1990 | Rothwell, Jr. et al. | 362/263 |
| 5,006,763 | 4/1991 | Anderson | 315/85 |

FOREIGN PATENT DOCUMENTS 60-131956 9/1985 Japan .
62-198046 9/1987 Japan .
63-62187 3/1988 Japan .

*Primary Examiner*—Ira S. Lazarus
*Assistant Examiner*—D. M. Cox
*Attorney, Agent, or Firm*—Foley & Lardner

[57] ABSTRACT

A headlamp for a motor vehicle comprises a power unit including an inverter, a starting circuit connected to the inverter, an electric discharge lamp bulb connected to the starting circuit, and a shell for holding the starting circuit and the electric discharge lamp bulb. A lens and a cap are fixedly mounted to the shell at the front and rear open ends thereof, respectively. The shell and the cap are coated with a metal film to provide shielding from radio noise due to high frequency pulses.

6 Claims, 4 Drawing Sheets

ELECTRIC DISCHARGE LAMP ARRANGEMENT AND HEADLAMP FOR MOTOR VEHICLE USING SAME

BACKGROUND OF THE INVENTION

The present invention relates generally to an electric discharge lamp arrangement and, more particularly, to a headlamp for a motor vehicle using such a lamp arrangement.

JP-A 63-62187 discloses an electric discharge lamp lighting device of a well known type. This lighting device is an inverter arrangement which changes DC power to AC power by switching operation of a semiconductor switching element, so as to provide the AC power to an electric discharge lamp. This includes an inverter having a control portion for switching control of the semiconductor switching element, a high voltage pulse generating circuit for starting the electric discharge lamp by providing high voltage pulses thereto, and a choke coil connected in series with the electric discharge lamp for regulating an electric current passing therethrough. In order to prevent a malfunction of the control portion by radio noise due to high voltage pulses of the high voltage pulse generating circuit, the semiconductor switching element and the control portion, and the high voltage pulse generating circuit and the choke coil are separately located in two different metallic shielding cases.

With such a known electric discharge lamp lighting device, however, the electric discharge lamp is not arranged in either metallic shielding case, and there is no shielding of a wire harness for connecting the lamp with the high voltage pulse generating circuit. This results in possible leakage of radio noise as described above from the wire harness.

Further, if this known electric discharge lamp lighting device is used in a headlamp for a motor vehicle, in separately locating the semiconductor switching element and the control portion, and the high voltage pulse generating circuit and the choke coil in the two different metallic shielding cases, this device is not easy to position due to limited space around the headlamp, and assembly efficiency is lowered.

SUMMARY OF THE INVENTION

It is, therefore, an object of the present invention to provide an electric discharge lamp arrangement which effectively shields from radio noise due to high voltage pulses upon starting of the electric discharge lamp.

It is another object of the present invention to provide a headlamp for a motor vehicle using the electric discharge lamp arrangement which effectively blocks the aforementioned radio noise without adversely affecting space and assembly efficiencies.

There is provided, according to the present invention, an electric lamp arrangement, comprising:

a power unit including an inverter;

starting circuit means connected to said power unit for generating high voltage pulses;

an electric discharge lamp bulb connected to said starting circuit means;

a casing so constructed and arranged as to receive said starting circuit means and said electric discharge lamp bulb, said casing being formed with an opening at one end thereof;

a lens fixedly mounted to said casing for concealing said opening; and means for electrically shielding said casing.

DETAILED DESCRIPTION OF THE INVENTION

Referring to the accompanying drawings, preferred embodiments of a headlamp for a motor vehicle according to the present invention will be described.

Figure 1:
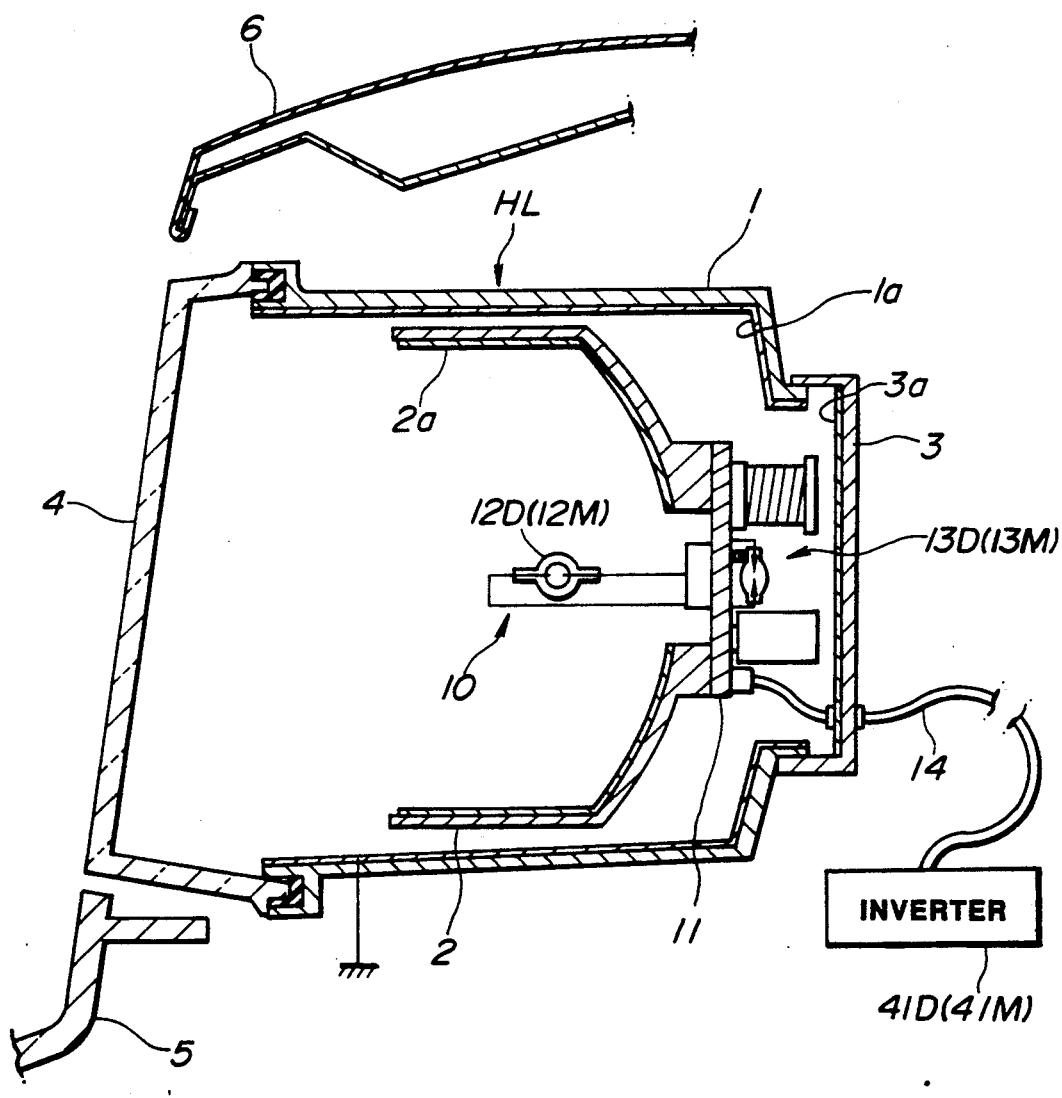
FIG. 1 is a sectional side elevation illustrating a first preferred embodiment of a headlamp for a motor vehicle according to the present invention.
Figure 2:
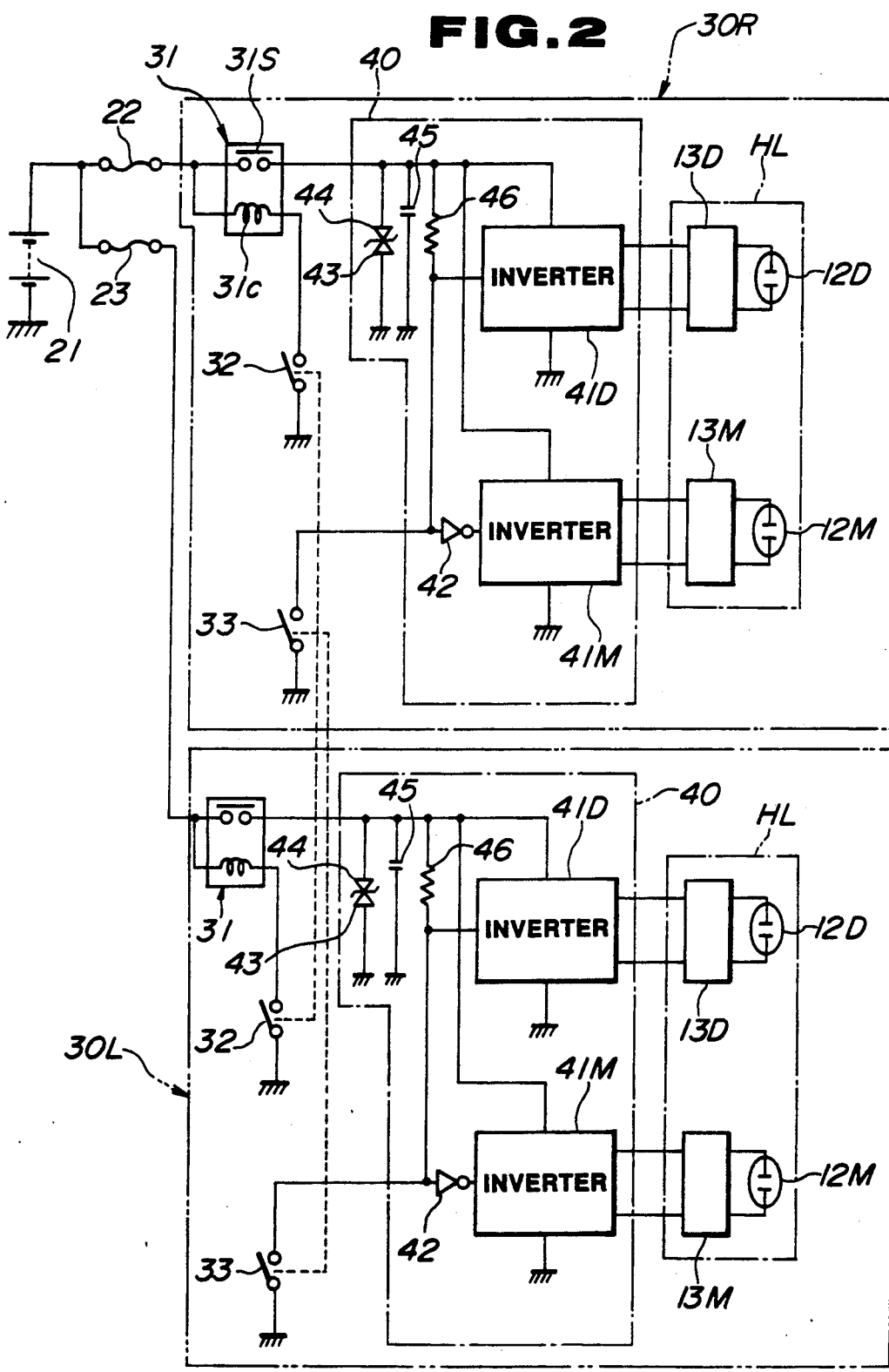
FIG. 2 is a diagram illustrating a lighting circuit of the headlamp shown in FIG. 1.
Figure 3:
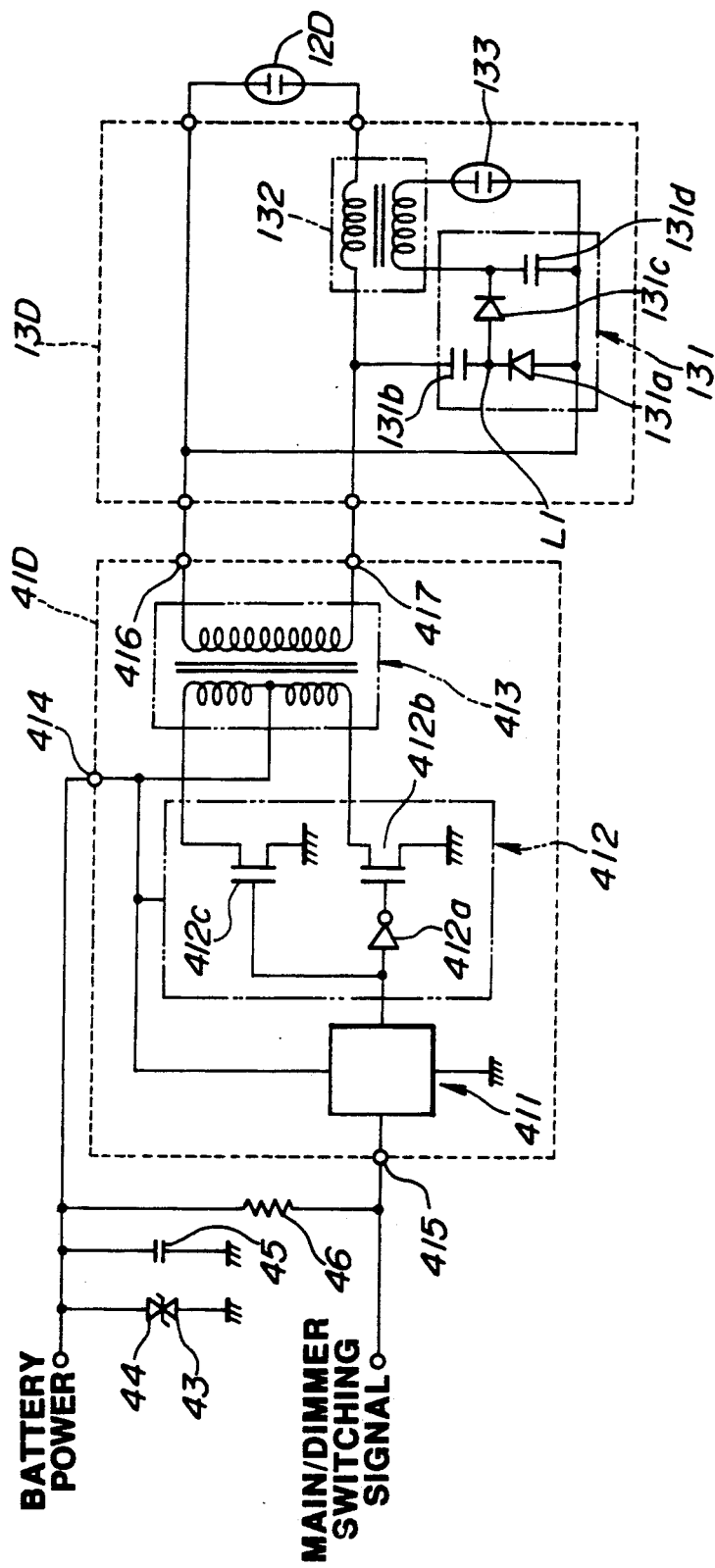
FIG. 3 is an inverter and a starting circuit of the lighting circuit shown in FIG. 2.

Referring to FIGS. 1-3, there is shown a first preferred embodiment of the present invention.

Referring to FIG. 1, each of the main and dimmer headlamps HL includes a shell 1 which has a rear open end which is concealed by a cap 3, and a front open end to which a lens 4 is mounted. The shell 1 and the cap 3 cooperate to form a casing. For purposes of shielding, metal films 1a and 3a are coated on an inner surface of the casing, i.e., on an inner circumferential surface of the shell 1, and an inside surface of the cap 3, and these are grounded. It is to be noted that shielding of the casing may be performed by other means, for example, by coating of the metal films 1a and 3a on an outer surface of the casing, and/or by the use of a resin for forming the casing which contains metal powder. In the shell 1, a reflector 2 having a reflection surface 2a coated thereon is installed an a mounting member (not shown). A bulb assembly 10 is detachably mounted to a base portion of the reflector 2. The headlamp HL is mounted in a space defined between a bumper 5 and an engine hood 6.

The bulb assembly 10 includes a base 11 which is detachably mounted to the base portion of the reflector 2, an electric discharge lamp bulb 12D (or 12M) which is arranged relative to the base 11 at the front side thereof as viewed in a normal driving direction of the motor vehicle, and a starting circuit 13D (or 13M) which is arranged to the base 11 at the rear side thereof as viewed in the normal driving direction of the motor vehicle. Through a wire harness 14, the starting circuit 13D is connected with an inverter 41D which is arranged outside of the shell 1. The starting circuit 13D and the inverter 41D will be described hereinafter.

Referring to FIG. 2, a battery 21 is connected to right and left headlamp lighting circuits 30R and 30L through two fuses 22 and 23. Since the lighting circuits 30R and 30L are the same in structure, a description will be provided only for the right headlamp lighting circuit 30R.

As described above, the battery 21 is connected to the right headlamp lighting circuit 30R through a relay 31. The relay 31 includes a coil 31C which has one end connected to the battery 21, and the other end grounded through a power switch 32 for the right headlamp. Additionally, the relay 31 includes a normally-open contact 31S which has one end connected to the battery 21, and the other end connected to a power unit 40. When the normally open contact 31S is closed by the power switch 32 being turned on, the battery 21 supplies electric power to the lighting circuit 30R.

The power unit 40 includes the main headlamp inverter 41M, and the dimmer headlamp inverter 41D as described hereinbefore. A control terminal of the inverter 41M is connected with a main/dimmer selector switch 33 through an invertor 42, whereas a control terminal of the inverter 41D is directly connected with the main/dimmer selector switch 33. This main/dimmer selector switch 33 is grounded. When the main/dimmer selector switch 33 is opened, the dimmer headlamp inverter 41D falls into an operating state, and the main headlamp inverter 41M falls into a nonoperating state. On the other hand, when the main/dimmer selector switch 33 is closed, the main headlamp inverter 41M falls into an operating state, and the dimmer headlamp inverter 41D falls into a nonoperating state. The inverters 41M and 41D are connected with the starting circuits 13M and 13D, respectively, to which electric discharge lamp bulbs 12M and 12D for the main and dimmer headlamps are connected, respectively.

Additionally, the power unit 40 includes a zener diode 43 for regulating the maximum applied voltage to the main and dimmer headlamp inverters 41M and 41D, a temperature compensating diode 44 for the maximum applied voltage regulated by the zener diode 44, a condenser 45, and a resistor 46. Turning on and turning off of the electric discharge bulbs 12M and 12D for the main and dimmer headlamps, and switching thereof are controlled by the power switch 32 and the main/dimmer selector switch 33, respectively.

Referring to FIG. 3, the main and dimmer headlamp inverters 41M and 41D include the same elements, respectively, as do the main and dimmer headlamp starting circuits 13M and 13D.

The dimmer headlamp inverter 41D includes a pulse generator 411, a chopper drive circuit 412, and a power transformer 413. Battery power is connected to the pulse generator 411 through a power terminal 414, and a main/dimmer switching signal is provided thereto through a control terminal 415. When the main/dimmer switching signal is at a high level, the pulse generator 411 is energized to output a pulse signal. The chopper drive circuit 412 includes an invertor 412a, and a pair of switching transistors 412b and 412c which are turned on and turned off alternately in response to the ON/OFF states of the incoming pulse signal. The power transformer 413 includes a primary coil having both ends grounded through the transistors 412b and 412c, respectively. An intermediate tap of the primary coil is connected with the power terminal 414. In response to alternate ON/OFF states of the transistors 412b and 412c, an electric current passes through the primary coil in a direction alternately changed, thus obtaining AC power from output terminals 416 and 417 of a secondary coil of the power transformer 413.

The dimmer headlamp starting circuit 13D includes a voltage doubler circuit 131, a pulse transformer 132, and a discharging gap 133. The voltage doubler circuit 131 in turn includes a diode 131a and a condenser 131b which are connected in series between the output terminals 416 and 417 of the secondary coil of the power transformer 413, and a diode 131c and a condenser 131d which are also connected in series, through the condenser 131b, between the output terminals 416 and 417. The pulse transformer 132 includes a primary coil having both ends connected to the condenser 131d and the discharging gap 133, respectively, and a secondary coil having respective ends connected to one electrode of the electric discharge lamp bulb 12D and the output terminal 417 of the secondary coil of the power transformer 413, respectively.

Next, the operation of this embodiment will be described.

If the power switch 32 is turned on with the main/dimmer selector switch 33 opened as shown in FIG. 2, the power unit 40 is supplied with electricity through the normally-open contact 31S being closed. Since the pulse generator 411 of the dimmer headlamp inverter 41D has control terminal 415 which is at a high level, it provides a pulse signal to the chopper drive circuit 412 when receiving DC power. Since the chopper drive circuit 412 alternately turns on and turns off the transistors 412b and 412c in response to the ON/OFF states of the incoming pulse signal, AC power is generated at the output terminals 416 and 417 of the power transformer 413. The AC power output thus generated is provided to not only both ends of the electric discharge lamp bulb 12D, but to the voltage doubler circuit 131. The voltage doubler circuit 131 increases the voltage of the AC power as follows.

When a positive voltage is present at the one output terminal 416 of the secondary coil of the power transformer 413, the condenser 131b is charged through the diode 131a, thus generating a positive potentiel V at a junction L1 of the condenser 131b and the diode 131a. In this state, if the positive voltage is present at the other output terminal 417 of the secondary coil, a potentiel 2 V is generated at the junction L1 so as to charge the condenser 131d through the diode 131c. Subjected to the potentiel 2 V, the discharging gap 133 is dielectrically broken down, and an electric charge of the condenser 131d is discharged through the primary coil of the pulse transformer 132. As a result, high voltage pulses are generated at the secondary coil of the pulse transformer 132, and the electric discharge lamp bulb 12D is dielectrically broken down and falls into a lighting state. Thereafter, the electric discharge lamp bulb 12D continues to be lighted by the AC power output provided at both ends thereof.

As described above, upon starting of the headlamp HL including the electric discharge lamp bulb 12D (or 12M), the high voltage pulses are generated at the secondary coil of the pulse transformer 132. Since the starting circuit 13D (or 13M) including the pulse transformer 132 is located in the casing including the shell 1 and the cap 3 shielded by the metal films 1a and 3a, there is no leakage of radio noise due to high voltage pulses.

Further, since a method is adopted in which the starting circuit 13D (or 13M) is located in the casing which is shielded, space and assembly efficiencies are improved as compared with a method in which it is located in its own shielding case, and arranged outside the casing.

Furthermore, since the bulb assembly 10 includes the electric discharge lamp bulb 12D (or 12M), and the starting circuit 13D (or 13M) mounted on the base 11 of a single unit on the right and reverse sides thereof, respectively, and it is detachably mounted to the reflector 2, assembly efficiency for bulb changing is improved.

Figure 4:
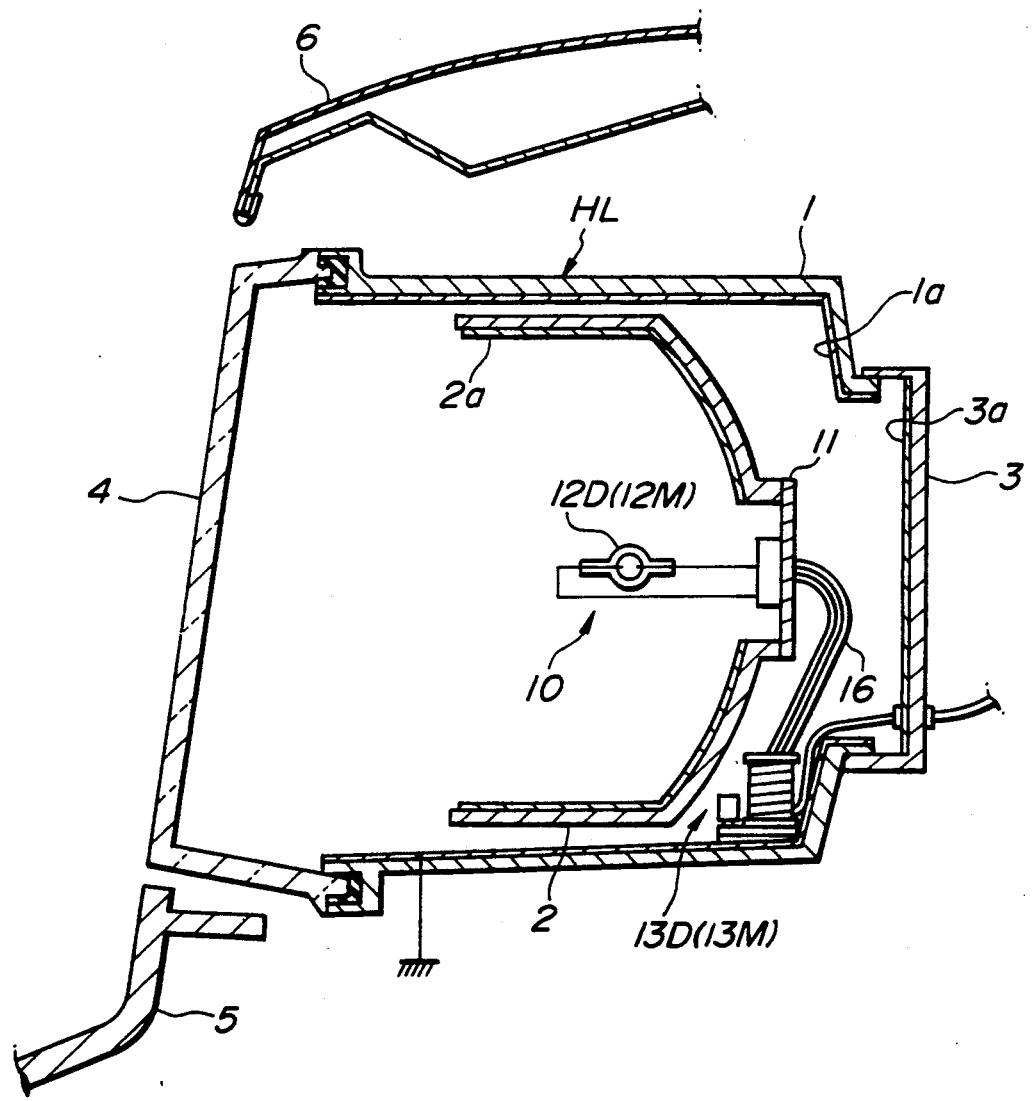
FIG. 4 is a view similar to FIG. 1, but illustrating a second preferred embodiment of a headlamp for a motor vehicle according to the present invention.

Referring to FIG. 4, there is shown a second preferred embodiment of the present invention.

In this embodiment, an electric discharge lamp bulb 12D (or 12M) and a starting circuit 13D (or 13M) are mounted separately from each other. Using the same reference numerals for the same elements as in FIG. 1, only the difference between the two will be described.

The electric discharge lamp bulb 12D is detachably mounted to a base portion of a reflector 2. The starting circuit 13D, which is mounted on the base 11 in the first preferred embodiment, is mounted on shell 1 at the lower portion thereof, and connected to the electric discharge lamp bulb 12D through a wire harness 16. The other features are the same as in the first preferred embodiment.

In this embodiment, also, there is no leakage of radio noise generated by the starting circuit 13D. Also, the space and assembly efficiencies are not adversely affected. Further, for bulb changing, the electric discharge lamp bulb 12D is the only component to be changed, resulting in lower maintenance cost.

What is claimed is:

1. An electric lamp arrangement, comprising:
   a power unit including an inverter;
   starting circuit means, connected to said power unit, for generating high voltage pluses;
   an electric discharge lamp bulb connected to said starting circuit means;
   a casing so constructed and arranged as to receive said starting circuit means and said electric discharge lamp bulb, said casing being formed with an opening at one end thereof;
   a lens fixedly mounted to said casing for covering said opening; and
   means for electromagnetically shielding said casing.

2. An electric lamp arrangement as claimed in claim 1, wherein said electromagnetically shielding means includes a metal layer covering said casing.

3. AN electric lamp arrangement as claimed in claim 1, wherein said electromagnetically shielding means includes a resin containing metal powder, said casing being made of said resin containing said metal powder.

4. An electric lamp arrangement as claimed in claim 1, wherein said electromagnetically shielding means includes a metal film disposed adjacent to said casing.

5. An electric lamp arrangement, comprising:
   a reflector;
   a power unit including an inverter;
   starting circuit means connected to said power unit for generating high voltage pulses;
   an electric discharge lamp bulb detachably mounted on said reflector at a base portion thereof, said electric discharge lamp bulb being connected to said starting circuit means;
   a casing so constructed and arranged as to receive said reflector, said starting circuit means and said electric discharge lamp bulb, said casing being formed with an opening at one end thereof;
   a lens fixedly mounted to said casing for concealing said opening; and
   means for electromagnetically shielding said casing, said electromagnetically shielding means being disposed between said reflector and said casing.

6. An electric lamp arrangement as claimed in claim 5, wherein said electromagnetically shielding means includes a metal film.

\* \* \* \* \*